United States Patent [19]

Yap

[11] Patent Number: 5,456,594
[45] Date of Patent: Oct. 10, 1995

[54] PULSATING COMBUSTION METHOD AND APPARATUS

[75] Inventor: Loo T. Yap, Princeton, N.J.

[73] Assignee: The BOC Group, Inc., New Providence, N.J.

[21] Appl. No.: 214,531

[22] Filed: Mar. 14, 1994

[51] Int. Cl.$^6$ .................................................. F23C 11/04
[52] U.S. Cl. .................................................. 431/1
[58] Field of Search .................................................. 431/1

[56] References Cited

U.S. PATENT DOCUMENTS

| 3,586,468 | 6/1971 | Sims et al. | 431/1 |
| 5,158,590 | 10/1992 | Jouvaud et al. | 65/134 |
| 5,302,111 | 4/1994 | Jouvaud et al. | 431/1 |

FOREIGN PATENT DOCUMENTS 9220395  7/1992  Australia .

Primary Examiner—Carroll B. Dority
Attorney, Agent, or Firm—David M. Rosenblum; Larry R. Cassett

[57] ABSTRACT

A method and apparatus for burning a fuel in the presence of an oxidant in which intermixing fuel jets are formed from fuel and oxidant flowing in a mixing layer. The fuel and the oxidant are combusted to produce a projected flame. Intermixture of the fuel and the oxidant jets occurs within a turbulent flow regime where the fuel and the oxidant are in close contact with one another within eddies. The fuel and the oxidant are intermixed in average stoichiometric proportions and the mass flow rates of the fuel or the oxidant or both are intermittent and have a regular pulsation. This regular pulsation has a sufficiently high frequency that the eddies contain the fuel and the oxidant in fuel-rich and fuel-lean ratios in an essentially even distribution through the projected flame. As a result a plurality of fuel-rich and fuel-lean regions are created throughout the projected flame and thermal $NO_x$ and carbon monoxide emissions are reduced. Fluidic oscillators are used to induce the pulsations in the mass flow rates since for most burners frequencies above 100 Hz are required.

6 Claims, 1 Drawing Sheet

PULSATING COMBUSTION METHOD AND APPARATUS

BACKGROUND OF THE INVENTION

The present invention relates to a method of burning a fuel in the presence of an oxidant in which intermixing fuel and oxidant jets are formed from fuel and oxidant flowing in a mixing layer. More particularly, the present invention relates to such a method and apparatus in which the mass flow rates of the fuel or the oxidant or both are intermittent and have regular pulsations of a sufficiently high frequency that an even distribution of fuel-rich and fuel-lean regions are created throughout a projected flame produced from combustion of the fuel and oxidant.

Burners in which fuel is burned in an oxidant, for instance, air, oxygen-enriched air, or oxygen, are utilized in many industrial processes where it is necessary to heat a melt. The burning of a fuel produces a pollutant known as thermal $NO_x$. The mount of thermal $NO_x$ produced reaches a maximum when the fuel is burned in stoichiometric proportions.

It is known in the an that if the fuel is either burned sub-stoichiometrically or super-stoichiometrically, thermal $NO_x$ emissions will be reduced. In line with this, Australian Patent No. 9220395 discloses a burner for an industrial furnace in which either the fuel, or oxidant or both is pulsated at a frequency of lower than 3 Hz, typically lower than 1 Hz. This has been found to reduce $NO_x$ emissions. At frequencies above 3 Hz, measured carbon monoxide emissions were found to increase and hence, a preferred frequency lower than 3 Hz was established for the burner. The burner of Australian Patent No. 9220395 is a relatively complex mechanical instrument that is fed by a duct work having valves which must continually open and close periodically at the desired pulsation frequency.

As will be discussed, the present invention provides a pulsation driven burning method and apparatus that is capable of operating at higher frequencies than the Australian '395 application with attendant low $NO_x$ and low carbon monoxide production. Additionally, the present invention provides a burner that is capable of pulsating combustion with far less complexity than prior art burners designed to pulsate fuel and/or oxidant.

SUMMARY OF THE INVENTION

The present invention provides a method of burning a fuel in the presence of an oxidant in which intermixing fuel and oxidant jets are formed from fuel and oxidant flowing at mass flow rates. The fuel and oxidant are combusted to produce a projected flame and are intermixed in a turbulent mixing layer where the fuel and oxidant are in close contact with one another within eddies. The fuel and the oxidant are intermixed in average stoichiometric proportions and the mass flow rates of the fuel or the oxidant or both are intermittent and have a regular pulsation. The regular pulsation has a sufficiently high frequency that the eddies contain the fuel and the oxidant in fuel-rich and fuel-lean rations in an essentially even distribution throughout the projected flame.

The regular pulsations having a pulsation frequency of at least the same order of magnitude as the turbulence frequency at which turbulence is generated from mean flow instabilities. It is for these order of unity Strouhal numbers (St=f D/V where f is forcing frequency, D is characteristic length of the burner flow, V is characteristic velocity of the burner flow) that the largest hydrodynamic instability is introduced and consequently the largest difference in tochiometry between the fuel-rich and fuel-lean eddies is obtained.

In another aspect, the present invention provides an apparatus for burning a fuel in the presence of an oxidant. In such apparatus a burner is provided having means for forming intermixing fuel and oxidant jets from fuel and oxidant flowing at mass flow rates and operable for combustion with a projected flame. The fuel and the oxidant jets intermix in a turbulent mixing layer where the fuel and the oxidant are in close contact with one another within eddies. A means is provided for supply the fuel and the oxidant to the burner at mass flow rates in average stoichiometric proportions. The supply means includes one fluidic oscillator for intermittently supplying the fuel or the oxidant to the burner in regular pulsations. The pulsations have a sufficiently high frequency that the eddies contain the fuel and the oxidant in fuel-rich and fuel-lean ratios. In still another aspect, the supply means include two fluidic oscillators for intermittently supplying the fuel and the oxidant to the burner in the regular pulsations. The regular pulsations have the sufficiently high frequency that the eddies contain the fuel and the oxidant in fuel-rich and fuel-lean ratios throughout the projected flame.

Typically, fuel and oxidant jets emanate from a burner at a speeds the order of 10–100 m/s and the resultant flames have lengths in the order of 2–5 m. If either the fuel or the oxidant or both are supplied in a pulsating manner at frequencies in the neighborhood of 3 Hz, then, it is apparent that the entire flame itself will swing back and forth between overall fuel-rich and fuel-lean stoichiometry. The result will be reduced $NO_x$ formation because the combustion, though on a long-time average will be stoichiometric, will at any one time be either fuel-rich or fuel-lean. On the other hand, the fuel-rich combustion will produce high carbon monoxide emissions.

Generally, in industrial burners fuel and oxidant jets are turbulent and a spectrum of eddies are formed which size range and frequencies can be estimated from turbulence theory. The fuel and oxidant react in the turbulent mixing layer. If the fuel, the oxidant or both are pulsed at a frequency having a magnitude in the order of the magnitude as the frequency at which turbulence is generated from mean flow instabilities, the strong hydrodynamic instabilities cause plurality of subregions to be formed on a microscopic scale throughout the flame. These subregions will have alternating fuel-rich and fuel-lean characteristics. As a result, as the frequency is in fact kept in this regime, the carbon monoxide levels and $NO_x$ levels produced by the combustion will actually decrease. Moreover, rather than employing valves, the present invention employs fluidic oscillators that have no moving pans. As such, the present invention is more simply effectuated than prior art pulsating burners.

BRIEF DESCRIPTION OF THE DRAWINGS

While the specification concludes with claims distinctly pointing out the subject matter that applicant regards as his invention, it is believed that the invention will be better understood when taken in conjunction with the accompanying drawings in which:

DETAILED DESCRIPTION

Figure 1:
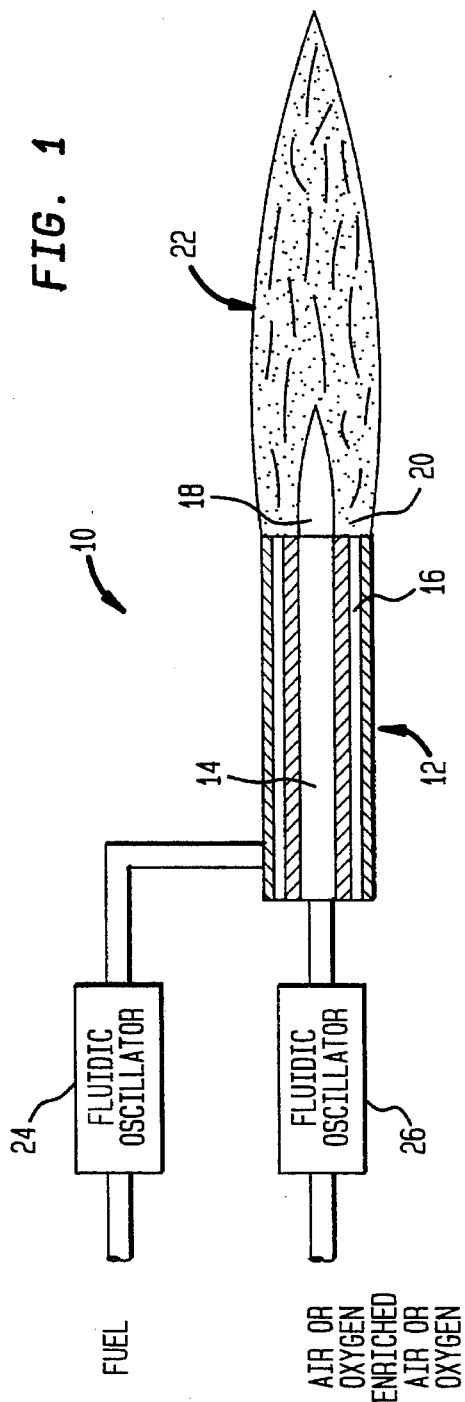
FIG. 1 is a schematic of an apparatus for performing a method in accordance with the present invention.

With reference to FIG. 1, an apparatus 10 in accordance with the present invention is illustrated. Apparatus 10 comprises a burner 12 that is designed to burn fuel in the presence of an oxidant. The term oxidant as used herein and in the claims means air or oxygen-enriched air or oxygen alone. The fuel can be a gas such as methane or a liquid such as oil. No particular type of burner is preferred in the subject invention and a form of burner 12 is illustrated for exemplary purposes only. Provided within burner 12 is a central oxidant passageway 14 surrounded by an annular fuel passageway 16. Intermixing fuel and oxidant jets 18 and 20 are formed by burner 12 and combustion of the fuel and oxidant produces a projected flame 22.

Figure 2:
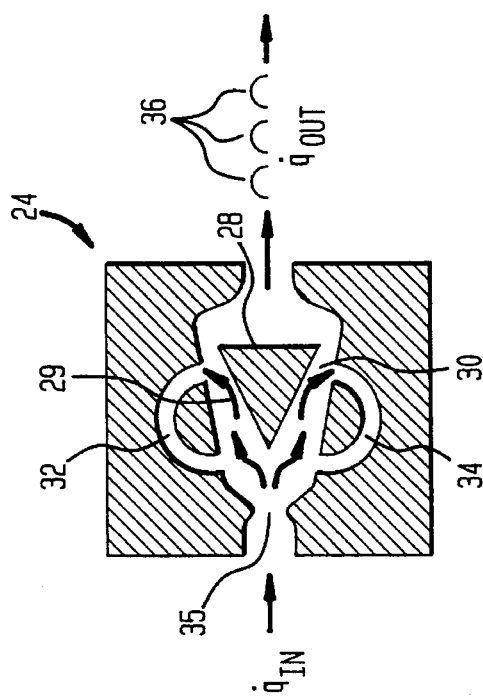
FIG. 2 is a schematic of a fluidic oscillator used in the present invention.

With additional reference to FIG. 2, the fuel and oxidant can be supplied to burner 12 by means of fluidic oscillators 24 and 26. The fluidic oscillators 24, 26 supply the fuel intermittently and in regular pulsations having a defined frequency. Fluidic oscillators are well known in the art of fluid mechanics but have not heretofore been applied to combustion. They are, however without moving pans devices. The internals of fluidic oscillator 24 would be the same as for fluidic oscillator 26 and hence, only fluidic oscillator 24 is illustrated. Fluid enters fluidic oscillator 24 at a mass flow rate $\dot{q}_{in}$. Splitter plate 28 causes the flow to split and alternately flow down leg 29 and leg 30 and vice-versa as a result of the flow in the feed-back loop 34 and 32, respectively, which moves the boundary layer from side to side in duct 35 prior to splitter plate 28. This produces an intermittent flow $\dot{q}_{out}$ which consists of regular pulsations 36. It is understood that other fluidic oscillators could be used with burner 10. It is also important to note that in the present invention, either fluidic oscillator 24 or fluidic oscillator 26 could be deleted to solely oscillate either the oxidant or fuel being supplied to burner 12.

Figure 3B:
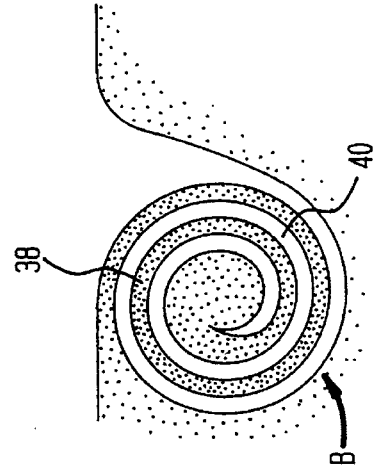
FIG. 3B a fuel-rich vortex roll-up.
Figure 3A:
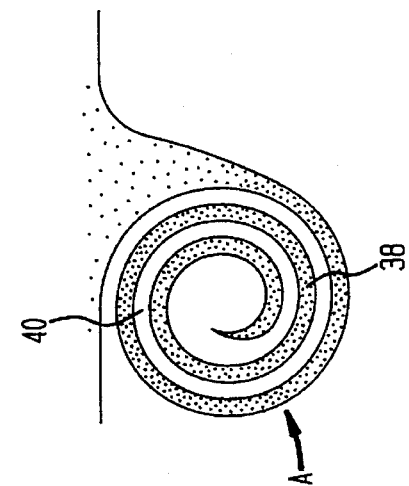
FIG. 3A a fuel-lean vortex rollup.

With reference to FIGS. 3A and 3B, intermixing fuel and oxidant jets 18 and 20 intermix in a turbulent mixing layer. The hydrodynamic instabilities of the flow produces eddies as a result of non-linear growth, for example, vortex A and B in which fuel 38 and oxidant 40 come into close physical contact so that reaction between the two can occur. Note that in vortex A, fuel 38 is rolling up around oxidant 40 to produce a fuel-lean region and that in vortex B, oxidant 40 is rolling up around fuel 38 to produce a fuel-rich combustion. To enhance the swings between vorticies A (fuel-lean) and vortices B (fuelrich), most effectively, hydrodynamic instabilities need to be driven at Strouhal numbers of unity. Assuming at the low end of the spectrum, the oxidant flows at a rate of approximately 10 m/s and the diameter of oxidant passageway 14 is about 0.1 m, then, the most effective driving frequency will be roughly in the order of $10^2$ hertz. Generally, the frequency will be greater and have a magnitude in the order of about $10^3$ to $10^4$.

Assuming the pulsation frequency of the pulsations 32 are equal at least to the magnitude of the aforementioned frequency of turbulence, then on a microscopic scale, the flame would be a mixture of fuel-rich and fuel-lean eddies and thus a mixture of regions throughout the flame that are fuel-rich and fuel-lean. The result of this is that even though overall stoichiometric amounts of oxygen are supplied to burner 12, the intermittent supply will produce fuel-rich or fuel-lean eddies or fuel-rich and fuel-lean regions within flame 22 which will not be stoichiometric. Hence, there will be a decrease in thermal $NO_x$ production. At the same time, the close proximity of the regions will cause unburned fuel from the fuel-rich regions or eddies to burn in the excess oxidant supplied by the fuel-lean regions or eddies. This will in turn reduce carbon monoxide formation from incomplete combustion of the fuel that would otherwise occur if the entire flame or large portions of the flame were oscillated from a fuel-rich to a fuel-lean condition.

In case both fuel and oxidant are oscillated, the pulsations of fuel and oxidant should be not in phase with one another such that pulsations of oxidant occur between pulsations of fuel and vice-versa.

While the present invention has been discussed with reference to a preferred embodiment, it will occur to those skilled in the art that numerous changes, and additions, and omissions can be made without departing from the spirit and scope of the present invention.

I claim:

1. A method of burning a fuel in the presence of an oxidant comprising:

forming intermixing fuel and oxidant jets from fuel and oxidant flowing at mass flow rates; and combusting the fuel and oxidant to produce a projected flame;

the fuel and oxidant jets being intermixed in a turbulent mixing layer where the fuel and the oxidant are in close contact with one another within eddies;

the fuel and the oxidant being intermixed in average stoichiometric proportions;

the mass flow rates of the fuel or the oxidant or both being intermittent and having a regular pulsation, said regular pulsating having a sufficiently high frequency of no less than about 100 Hz that the eddies contain the fuel and the oxidant in fuel-rich and fuel-lean ratios in an essentially even distribution throughout said projected flame.

2. The method of claim 1, wherein both the mass flow rates of said fuel and oxidant are intermit and have regular pulsations that are out of phase with one another.

3. The method of claim 1 or 2 wherein said pulsation frequency is in a range of between about $10^3$ and about $10^4$ Hz.

4. The method of claim 1 or 2 wherein the regular pulsation is introduced into the mass flow rates of either the fuel or the oxidant by a fluidic oscillator.

5. An apparatus for burning a fuel in the presence of an oxidant comprising:

a burner having means for forming intermixing fuel and oxidant jets from fuel and oxidant from fuel and oxidant flowing at mass flow rates and operable for combustion with a projected flame, the fuel and the oxidant jets intermixing in a turbulent mixing layer where the fuel and the oxidant are in close contact with one another within eddies; and means for supplying the fuel and oxidant to the burner at said mass flow rates and in average stoichiometric proportions;

said supply means including one fluidic oscillator for intermittently supplying the fuel or the oxidant to the burner intermittently and in regular pulsations, said pulsations having a sufficiently high frequency of no less than about 100 Hz that the eddies contain the fuel and the oxidant in fuel-rich and fuel-lean ratios in an essentially even distribution throughout said projected flame.

6. An apparatus for burning a fuel in the presence of an oxidant comprising:

a burner having means for forming intermixing fuel and oxidant jets from fuel and oxidant from fuel and oxidant flowing at mass flow rates and operable for combustion with a projected flame, the fuel and the oxidant jets intermixing in a turbulent mixing layer where the fuel and the oxidant are in close contact with one another within eddies; and means for supplying the fuel and oxidant to the burner at said mass flow rates and in average stoichiometric proportions;

said supply means including two fluidic oscillators for intermittently supplying the fuel and the oxidant to the burner intermittently and in regular pulsations, said pulsations having a sufficiently high frequency of no less than about 100 Hz that the eddies contain the fuel and the oxidant in fuel-rich and fuel-lean ratios in an essentially even distribution throughout said projected flame.

* * * * *